(12) United States Patent
Weimer et al.

(10) Patent No.: US 6,616,978 B1
(45) Date of Patent: Sep. 9, 2003

(54) PROTECTING A SUBSTRATE WITH A MULTILAYER OXIDE/PHOSPHATE COATING HAVING A TEMPERATURE-STEPPED CURE

(75) Inventors: Michael James Weimer, Loveland, OH (US); Joseph Aloysius Heaney, Middletown, OH (US); Bangalore Aswatha Nagaraj, West Chester, OH (US); James Andrew Hahn, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/147,172

(22) Filed: May 9, 2002

(51) Int. Cl.⁷ .............................. B05D 1/36; B05D 3/02
(52) U.S. Cl. ................ 427/379; 427/376.1; 427/376.2; 427/380; 427/419.1; 427/419.2; 427/419.3
(58) Field of Search ............................ 427/419.1, 419.2, 427/419.3, 376.1, 376.2, 379, 380

(56) References Cited

U.S. PATENT DOCUMENTS

| 3,248,251 A | 4/1966 | Allen |
| 4,863,516 A | 9/1989 | Mosser et al. |
| 5,260,099 A * | 11/1993 | Haskell ...................... 427/367 |
| 2002/0107133 A1 * | 8/2002 | Troczynski et al. ............ 501/1 |

* cited by examiner

Primary Examiner—Michael Barr
(74) Attorney, Agent, or Firm—Gregory O. Garmong; Carmen Santa Maria; McNees Wallace & Nurick LLC

(57) ABSTRACT

A substrate is protected by a multilayer protective coating having an oxide layer, and a phosphate/organic binder layer initially overlying the oxide layer. The multilayer protective coating is cured by first degassing the multilayer protective coating in a pre-cure degassing temperature range of from about 250° F. to about 500° F. for a time of at least about 30 minutes. The multilayer protective coating is thereafter heated to a curing temperature range of from about 1200° F. to about 1400° F. for a time of at least about 30 minutes.

14 Claims, 3 Drawing Sheets

PROTECTING A SUBSTRATE WITH A MULTILAYER OXIDE/PHOSPHATE COATING HAVING A TEMPERATURE-STEPPED CURE

This invention relates to protective coatings and, more particularly, to the processing of an oxide/phosphate coating to minimize physical defects therein.

BACKGROUND OF THE INVENTION

In many aircraft gas turbine applications, articles are simultaneously exposed to elevated temperatures and oxidative/corrosive environments. The corrosion arises both from corrosive species such as salts that are ingested into the gas turbine with its air supply, and also corrosive species that are produced in the combustor when the ingested air is mixed with fuel and ignited. The corrosion of the articles in many cases is accelerated by the loads applied to the articles. The general trend in aircraft gas turbine engine design is toward higher operating temperatures and applied loads for improved fuel efficiency and performance. This trend leads to a greater severity of the oxidation and corrosion problems with increasing temperatures.

Protective coatings are applied to the articles to inhibit the environmental damage. A wide variety of protective coatings are used, according to whether the application involves exposure to air or to combustion gas, the temperature, the thermal excursions during service, whether wear occurs at the surface, and other factors. These protective coatings are usually applied to new articles, and then reapplied during repair and refurbishment.

One type of protective coating utilizes a multilayer arrangement of one or more oxide-based layers applied to the surface of the article substrate, and a phosphate layer applied over the oxide layer(s) as a sealant. After application, the protective coating is cured. This protective coating is relatively thin, on the order of 0.0005–0.0025 inches in thickness depending upon the selection of the types of layers.

The oxide/phosphate protective coating has good corrosion protection for its thickness, at temperatures of up to about 1400° F. However, it has some shortcomings, and there is a need for an improved approach to such oxide/phosphate coatings. The present invention fulfills this need, and further provides related advantages.

BRIEF SUMMARY OF THE INVENTION

The present invention provides a substrate protected by a protective coating of the thin, multilayer oxide/phosphate type, and a method for preparing the protected substrate. In the work leading to the present invention, the inventors have observed that the conventionally applied oxide/phosphate coatings often exhibit physical defects in the form of regions of small bubbles and local areas of coating spallation. These physical defects compromise the performance of the protective coating by serving as openings through the protective coating, through which the corrodants may penetrate to the article substrate. The present approach reduces the occurrence of these physical defects, producing a smooth, continuous protective coating of near-uniform thickness. The protective coating therefore provides excellent protection to the article substrate at intermediate service temperatures.

A method for protecting a substrate includes the steps of providing a substrate, such as a component of a gas turbine engine, and applying a multilayer protective coating to the substrate to form an initially coated substrate. The multilayer protective coating comprises an oxide layer (preferably comprising oxide particles in a binder such as a phosphate binder) and a phosphate layer overlying the oxide layer. The oxide layer may include a single layer, such as a chromium oxide layer, or it may include two or more sublayers, such as an aluminum oxide sublayer and a chromium oxide sublayer. The phosphate layer is preferably initially an inorganic phosphate in an organic binder. The multilayer protective coating is cured by degassing the multilayer protective coating of the initially coated substrate in a pre-cure degassing temperature range of from about 250° F. to about 500° F. for a time of at least about 30 minutes, and thereafter heating the multilayer protective coating to a curing temperature range of from about 1200° F. to about 1400° F. for a time of at least about 30 minutes. Optionally, there may be an additional step, after the step of degassing and before the step of heating, of maintaining the multilayer protective coating in a mid-temperature range of from about 500° F. to about 1200° F. for a time of more than about 30 minutes, and preferably from about 30 to about 90 minutes.

The degassing step may be performed by holding the multilayer protective coating at a pre-cure degassing temperature within the pre-cure degassing temperature range for a time of from about 30 to about 90 minutes. It may instead be performed by maintaining the multilayer protective coating within the pre-cure degassing temperature range (but not necessarily at the constant pre-cure degassing temperature) for a time of from about 30 to about 90 minutes. For example, the multilayer protective coating may be continuously heated through the pre-cure degassing temperature range but not held at any fixed temperature within that range.

Similarly, the optional step of maintaining the multilayer protective coating in the mid-temperature range may be performed by holding at a mid-range temperature in the mid-temperature range. It may instead be performed by maintaining the multilayer protective coating within the mid-temperature range (but not necessarily at any constant temperature value) for a time of from about 30 to about 90 minutes. For example, the multilayer protective coating may be continuously heated through the mid-temperature range.

This stepped heating approach allows gases and organic components of the initially applied protective coating to be gradually evolved through the protective coating and to the atmosphere, before the protective coating cures and hardens. The gases and organic components are therefore not trapped within the protective coating, leading to the physical defects discussed earlier. In the prior approach wherein curing was accomplished in a single step, typically by placing the initially coated substrate article in a furnace at an elevated temperature, the curing of the protective coating tended to trap the gases and organic components of the phosphate binder within the coating because they were evolved simultaneously with the curing and hardening of the protective coating. Since the protective coating is most rapidly heated at its surface, it tends to harden from the outside toward the inside of the protective coating, increasing the incidence of trapping of gases and organic components within the protective coating. The present approach allows the gases and organic components to evolve before the protective coating cures.

The resulting article substrate with its protective coating is therefore substantially free of physical defects in the protective coating. As a result, the points of weakness in the corrosion protection, associated with such physical defects, are minimized. The protection afforded by the protective coating is therefore more complete than that provided by the protective coating of the prior approach. The present heating procedure is slower than that conventionally used, but it leads to a better protective coating.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
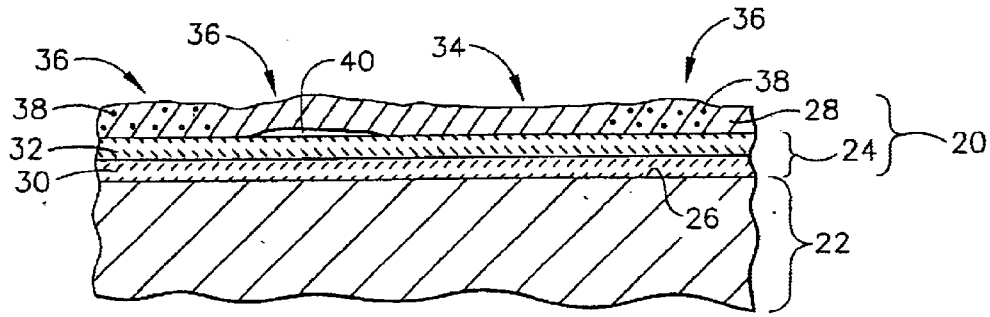
FIG. 1 is a schematic sectional view of a conventionally prepared oxide/phosphate protective coating.

FIG. 1 depicts a conventionally prepared oxide/phosphate protective coating 20 deposited upon a substrate 22. The protective coating 20 includes an oxide layer 24 overlying and contacting a surface 26 of the substrate 22, and a phosphate layer 28 overlying and contacting the oxide layer 24. The oxide layer 24 has two sublayers in the illustrated embodiment, an aluminum oxide sublayer 30 of aluminum oxide particles in a phosphate binder contacting the surface 26 of the substrate 22, and a chromium oxide sublayer 32 of chromium oxide particles in a phosphate binder overlying and contacting the aluminum oxide sublayer 30.

During the conventional processing, the protective coating 20 is heated directly to a curing temperature in a single step, held at the curing temperature for a period of time, and then cooled to room temperature. As seen in FIG. 1, the resulting protective coating 20 has some regions 34 that are physically acceptable. Other regions have local physical defects 36, including, for example, bubbles 38 and areas 40 of debonding or spallation. These physical defects 36 reduce the protective ability of the protective coating 20 by serving as, or leading to, openings through the protective coating 20 to the substrate 22. Corrosion occurs at the surface 26 of the substrate 22 at these locations associated with the physical defects 36, leading to a weakening and possible failure of the substrate 22.

Figure 2:
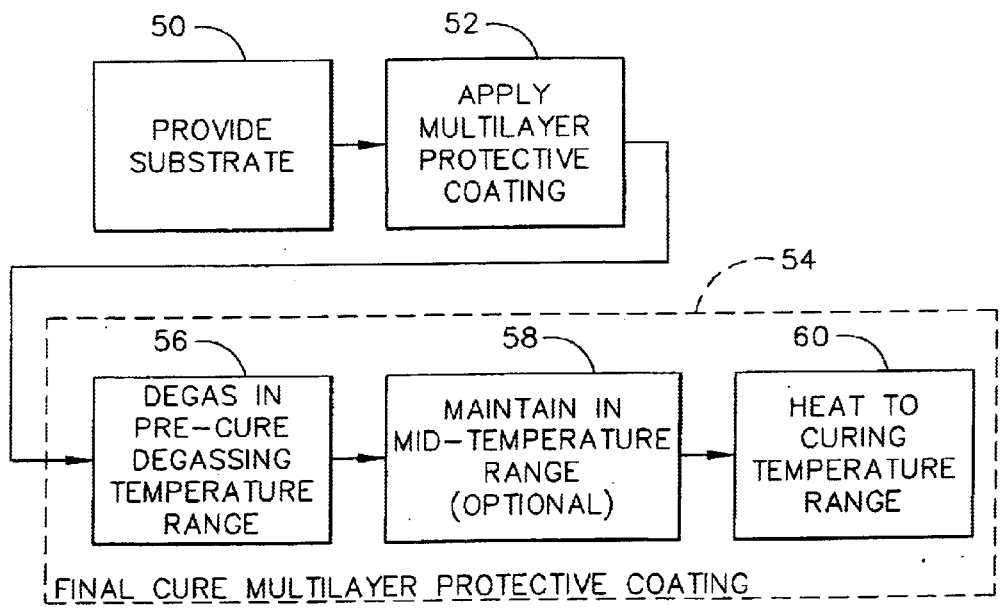
FIG. 2 is a block flow diagram of a preferred approach for practicing the present invention.
Figure 3:
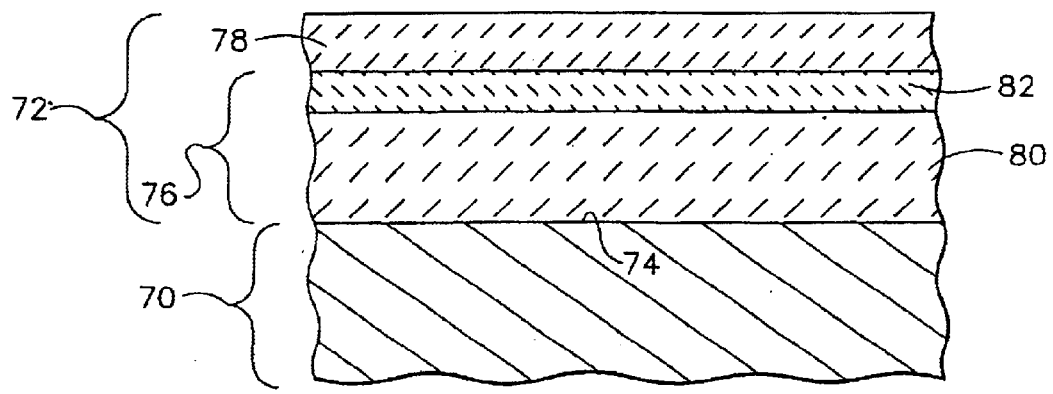
FIG. 3 is a schematic sectional view of a first embodiment of an oxide/phosphate protective coating prepared by the present approach.
Figure 4:
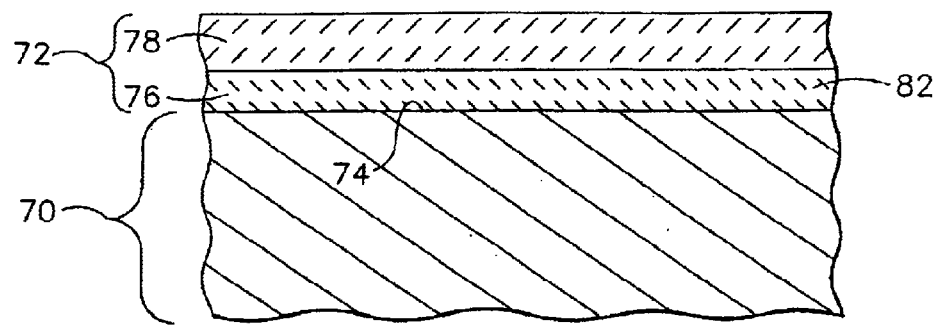
FIG. 4 is a schematic sectional view of a second embodiment of an oxide/phosphate protective coating prepared by the present approach.

FIG. 2 depicts a method for protecting a substrate that avoids these physical defects 36, leading to better protection of the substrate. FIGS. 3–4 depict two embodiments of protected substrates produced by this method of FIG. 2.

A substrate 70 is provided, step 50 of FIG. 2. The substrate 70 may be of any form, but is preferably a component of a gas turbine engine. Examples of such components include a compressor disk, a compressor blade or vane, a turbine disk, and the under-platform portion of a turbine blade. The substrate 70 is a metal, such as a nickel-base superalloy or an iron-base superalloy. A nickel-base alloy is an alloy having more nickel than any other element. A nickel-base superalloy is a nickel-base alloy strengthened by the precipitation of gamma-prime phase or a related phase. A nickel-base superalloy of interest is Rene 88, a known alloy having a nominal composition, in weight percent, of 13 percent cobalt, 16 percent chromium, 4 percent molybdenum, 3.7 percent titanium, 2.1 percent aluminum, 4 percent tungsten, 0.75 percent niobium, 0.02 percent boron, 0.04 percent zirconium, and 0.04 percent carbon, balance nickel and minor impurity elements.

A multilayer protective coating 72 is applied to a surface 74 of the substrate 70, step 52 of FIG. 2. The multilayer protective coating 72 includes an oxide layer 76 overlying and contacting the surface 74 of the substrate 70, and a phosphate layer 78 overlying and contacting the oxide layer 76. FIG. 3 depicts an embodiment wherein the oxide layer 76 includes an aluminum oxide sublayer 80 (of aluminum oxide particles in a phosphate binder such as a chromium-magnesium phosphate binder) overlying and contacting the surface 74 of the substrate 70, and a chromium oxide sublayer 82 (of chromium oxide particles in a phosphate binder such as the chromium-magnesium phosphate binder) overlying and contacting the aluminum oxide sublayer 80. In the embodiment of FIG. 4, there is only the chromium oxide sublayer 82 overlying and contacting the surface 74 of the substrate 70, and no aluminum oxide layer. The phosphate layer 78 comprises a phosphate such as chromium-magnesium phosphate in an organic binder when initially applied to form an initially coated substrate.

The protective coating 40 is applied, numeral 52. The step of applying 52 may be accomplished by any operable approach. The oxides and the phosphate are preferably provided as separate slurries in a carrier such as water or an organic liquid, in the manner of a paint. The paint layers and/or sublayers are then applied in the indicated order, with intermediate air drying between the application of each layer and/or sublayer.

After the initially coated substrate with the multilayer protective coating is prepared by steps 50 and 52, the initially applied multilayer protective coating 72 is final cured, step 54. "Cure" is used herein to mean the removal of volatile phases and gas, and the stabilization and partial consolidation of the protective coating 72. The constituents of the coating react to form a chromium-magnesium-phosphate glass phase which entraps the aluminum oxide and the chromium oxide. "Cure" is not used to mean the crosslinking or other chemical reaction of a monomer or other organic constituent that produces a polymer in the protective coating 72. The final protective coating 72 is desirably free of organic constituents, water, and gases, all of which become volatile and evolve during the curing process.

The curing step 54 is accomplished in at least two, and more preferably three, stepwise phases of heating. Heating may be accomplished in any operable manner. In one approach, the entire substrate 70 and the initially applied multilayer protective coating 72 are heated together, as in an oven with a programmed temperature cycle. In another approach, the initially applied multilayer protective coating is surface heated, as with heat lamps, and the substrate is thereby incidentally heated.

Figure 5:
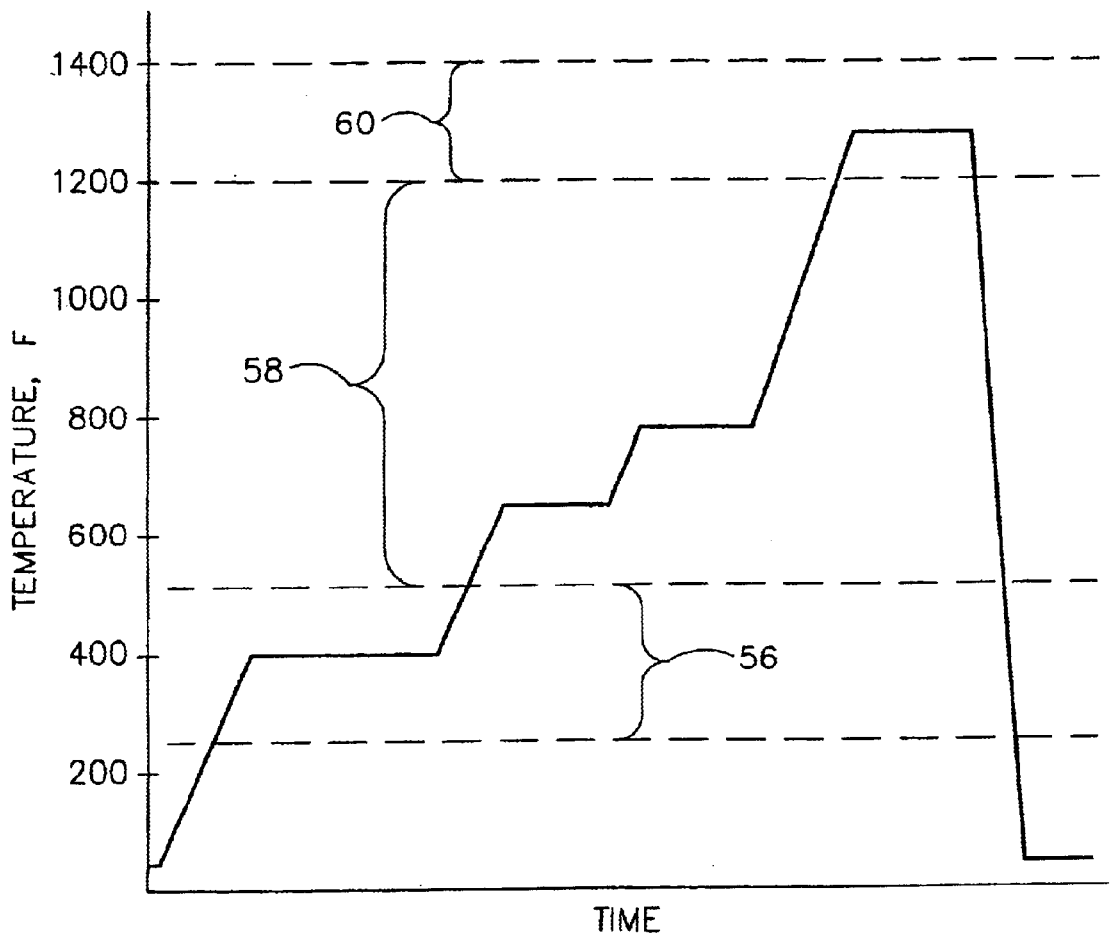
FIG. 5 is a schematic graph of temperature as a function of time in the curing step.

The heating phases are described in FIG. 2, and shown in a schematic temperature-time graph of FIG. 5. The multilayer protective coating is initially degassed in a pre-cure degassing temperature range of from about 250° F. to about 500° F. for a time of at least about 30 minutes, step 56. The degassing step 56 may be accomplished in any operable manner, as long as the multilayer protective coating 72 remains in the specified pre-cure degassing temperature range for at least the specified time. That is, the degassing step 56 may be performed by heating the multilayer protective coating to a fixed degassing temperature and holding at that temperature, heating to a series of degassing temperatures and holding at the succession of degassing temperatures, or continuously heating through the degassing temperature range while ensuring that the multilayer protective coating remains in the degassing temperature range for at least the specified time.

The degassing temperature range is above that at which most volatile phases become gaseous, and below that at which substantial hardening of the phosphate occurs. The time of at least about 30 minutes ensures that the volatile phases will evolve. Longer times than about 90 minutes are permissible but do no further good and therefore unnecessarily prolong the curing cycle. Accordingly, gases, vapors, and other volatile constituents liberated in this temperature range are largely free to migrate to the exposed surface of the multilayer protective coating 72 and escape, without being trapped in the multilayer protective coating 72 to produce the types of physical defects 36 illustrated in FIG. 1.

The multilayer protective coating 72 may be heated directly to the final curing temperature from the pre-cure degassing temperature range. Optionally but preferably, it is gradually heated through and maintained in a mid-temperature range of from about 500° F. to about 1200° F. for a time of at least about 30 minutes, and preferably from about 30 to about 90 minutes, step 58. The optional mid-range temperature step 58 is preferred to ensure that all of the volatile constituents are evolved before the multilayer protective coating hardens. The gradual heating in the mid-temperature range allows more-complete evolution and elimination of such additional volatile constituents. As with the degassing step 56, the mid-temperature heating 58 may be performed by heating the multilayer protective coating to a fixed mid-range temperature and holding at that mid-range temperature, heating to a series of mid-range temperatures and holding at the succession of mid-range temperatures, or continuously heating through the mid-temperature range while ensuring that the multilayer protective coating remains in the mid-temperature range for at least the specified time.

The multilayer protective coating 72, now free of virtually all volatile constituents, is thereafter heated to a curing temperature range of from about 1200° F. (which is above the conventional curing temperature) to about 1400° F. for a time of at least about 30 minutes, step 60 of FIGS. 2 and 5. In this curing temperature range, the phosphate layer 78 is completely cured, and the multilayer protective coating 72 is fully consolidated and stabilized. After the curing is complete, the multilayer protective coating is cooled to room temperature.

Some examples of curing temperature profiles that may be conducted with the present approach include: (1) heat and hold at 250–500° F. for 30–90 minutes, followed by heat and hold at 650–1000° F. for 30–90 minutes, followed by heat and hold at 1200–1400° F. for 30–90 minutes; or (2) heat and hold at 250–350° F. for 30–90 minutes, followed by heat and hold at 500–700° F. for 30–90 minutes, followed by heat and hold at 900–1100° F. for 30–90 minutes, followed by heat and hold at 1200–1400° F. for 30–90 minutes. In each of these curing temperature profiles, the ramp rate between hold temperatures is preferably from about 3° F. per minute to about 100° F. per minute. In another approach, the heating is (3) continuous from room temperature to the curing temperature range of 1200–1400° F. at a rate of about 1–30° F. per minute, but ensuring that the previously discussed time-in-temperature-range limitations are satisfied.

The invention has been reduced to practice using the preferred coating discussed above, and comparative testing have been performed with the conventional approach. In a first heating procedure according to the present approach, the specimens were ramped at a rate of 30° F. per minute from room temperature to 300° F. and held at 300° F. for 1 hour, thereafter ramped at a rate of 30° F. per minute to 600° F. and held at 600° F. for 1 hour, thereafter ramped at a rate of 30° F. per minute to 1000° F. and held at 1000° F. for 1½ hour, and thereafter ramped at a rate of 30° F. per minute to 1350° F. and held at 1350° F. for 1 hour. In a second heating procedure according to the present approach, the specimens were ramped at a rate of 30° F. per minute from room temperature to 350° F. and held at 350° F. for 1 hour, thereafter ramped at a rate of 30° F. per minute to 800° F. and held at 800° F. for 1½ hour, and thereafter ramped at a rate of 30° F. per minute to 1350° F. and held at 1350° F. for 1 hour. Sintering and blistering were evaluated qualitatively, and they were reduced as compared with the conventional approach.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for protecting a substrate, comprising the steps of providing a substrate;

applying a multilayer protective coating to the substrate to form an initially coated substrate, the multilayer protective coating comprising an oxide layer comprising oxide particles in an oxide-layer binder, and a phosphate layer overlying the oxide layer, the phosphate layer comprising a phosphate in a binder; and curing the multilayer protective coating by degassing the multilayer protective coating of the initially coated substrate in a pre-cure degassing temperature range of from about 250° F. to about 500° F. for a time of at least about 30 minutes, and thereafter heating the multilayer protective coating to a curing temperature range of from about 1200° F. to about 1400° F. for a time of at least about 30 minutes.

2. The method of claim 1, wherein the step of degassing includes the step of holding the multilayer protective coating at a pre-cure degassing temperature within the pre-cure degassing temperature range for a time of from about 30 to about 90 minutes.

3. The method of claim 1, wherein the step of degassing includes the step of maintaining the multilayer protective coating within the pre-cure degassing temperature range for a time of from about 30 to about 90 minutes.

4. The method of claim 1, wherein the step of degassing includes the steps of continuously heating the multilayer protective coating through the pre-cure degassing temperature range.

5. The method of claim 1, wherein the step of curing includes an additional step, after the step of degassing and before the step of heating, of holding the multilayer protective coating at a mid-range temperature in a mid-temperature range of from about 500° F. to about 1200° F. for a time of at least about 30 minutes.

6. The method of claim 1, wherein the step of curing includes an additional step, after the step of degassing and before the step of heating, of maintaining the multilayer protective coating in a mid-temperature range of from about 500° F. to about 1200° F. for a time of at least about 30 minutes.

7. The method of claim 1, wherein the step of curing includes an additional step, after the step of degassing and before the step of heating, of continuously heating the multilayer protective coating through a mid-temperature range of from about 500° F. to about 1200° F., so that the multilayer protective coating is in the mid-temperature range for a time of at least about 30 minutes.

8. The method of claim 1, wherein the step of applying the multilayer protective coating includes the step of applying the oxide layer including
an aluminum oxide sublayer, and
a chromium oxide sublayer overlying the aluminum oxide sublayer.

9. The method of claim 1, wherein the step of providing the substrate includes the step of providing the substrate in the form of a component of a gas turbine engine.

10. A method for protecting a substrate, comprising the steps of providing a substrate;
applying a multilayer protective coating to the substrate to form an initially coated substrate, the multilayer protective coating comprising
an aluminum oxide sublayer overlying and contacting the substrate, the aluminum oxide sublayer comprising aluminum oxide particles in an aluminum-oxide sublayer phosphate binder,
a chromium oxide sublayer overlying and contacting the aluminum oxide sublayer, the chromium oxide sublayer comprising chromium oxide particles in a chromium oxide sublayer phosphate binder, and
a phosphate layer overlying and contacting the chromium oxide sublayer, the phosphate layer comprising a phosphate in a binder; and curing the multilayer protective coating by
degassing the multilayer protective coating of the initially coated substrate in a pre-cure degassing temperature range of from about 250° F. to about 500° F. for a time of at least about 30 minutes, and thereafter
heating the multilayer protective coating to a curing temperature range of from about 1200° F. to about 1400° F. for a time of at least about 30 minutes.

11. The method of claim 10, wherein the step of curing includes an additional step, after the step of degassing and before the step of heating, of holding the multilayer protective coating at a mid-range temperature in a mid-temperature range of from about 500° F. to about 1200° F. for a time of from about 30 to about 90 minutes.

12. The method of claim 10, wherein the step of curing includes an additional step, after the step of degassing and before the step of heating, of maintaining the multilayer protective coating in a mid-temperature range of from about 500° F. to about 1200° F. for a time of from about 30 to about 90 minutes.

13. The method of claim 10, wherein the step of curing includes an additional step, after the step of degassing and before the step of heating, of continuously heating the multilayer protective coating through a mid-temperature range of from about 500° F. to about 1200° F., so that the multilayer protective coating is in the mid-temperature range for a time of from about 30 to about 90 minutes.

14. The method of claim 10, wherein the step of providing the substrate includes the step of providing the substrate in the form of a component of a gas turbine engine.

\* \* \* \* \*